Aug. 25, 1925.  1,551,230

E. P. ARMSTRONG

HAND OPERATED CIRCULAR SAW SHARPENER AND GUMMER

Filed Dec. 20, 1921   2 Sheets-Sheet 1

Inventor:
Edward P. Armstrong
by  Y. J. Geisler
      Atty.

Aug. 25, 1925.　　　　　　　　　　　　　　　　1,551,230
E. P. ARMSTRONG
HAND OPERATED CIRCULAR SAW SHARPENER AND GUMMER
Filed Dec. 20, 1921　　　2 Sheets-Sheet 2

Inventor:
Edward P. Armstrong

Patented Aug. 25, 1925.

1,551,230

UNITED STATES PATENT OFFICE.

EDWARD P. ARMSTRONG, OF PORTLAND, OREGON, ASSIGNOR TO ARMSTRONG MANUFACTURING CO., OF PORTLAND, OREGON.

HAND-OPERATED CIRCULAR-SAW SHARPENER AND GUMMER.

Application filed December 20, 1921. Serial No. 523,729.

*To all whom it may concern:*

Be it known that I, EDWARD P. ARMSTRONG, a citizen of the United States, and a resident of Portland, county of Multnomah, and State of Oregon, have invented a certain new and useful Improvement in a Hand-Operated Circular-Saw Sharpener and Gummer, of which the following is a specification.

My invention relates to manually operated saw sharpening and gumming machines which are particularly adapted for use with circular saws.

One of the main objects of my invention is to provide a machine of this character which has a horizontally rotatable saw holding head adjustable to any desired angle, and which is mounted in a frame work in such a manner that when arranged angularly it may be rigidly supported in correct alinement in the position in which set.

A further object is to provide means for locking said adjustable saw holding head in set position which means at the same time serve to true up the saw holding head and thereby the saw relatively to the grinder wheel, even though the bearing surfaces of the machine have become worn so that there might be an appreciable amount of play.

A further object is to provide an adjustable mechanism for the saw so that the machine can accommodate different diameter saws and which permits the saw operated on to be adjusted vertically and horizontally, and permits each of the adjustments to be made independently of the other.

I attain my objects in a saw sharpening machine comprising a frame, saw-sharpening devices including a grinder-wheel carried by the frame, and a saw-holding head rotatable in a horizontal plane for adjustment relatively to said grinder-wheel, guide elements for said head, provided on said frame and said head respectively, comprising two horizontal arcuate guide portions concentric with the axis of rotation of said head and vertically spaced apart, guide rollers co-operating with said guide portions, said guide rollers being located relatively to said axis and so as to provide a three point support for said head at all times, means, provided on said frame and head respectively, for holding the latter in horizontal alinement, such means comprising horizontal arcuate racks concentric with said axis and vertically spaced apart, and pinions rigid on a common shaft meshing with said racks, means for locking the devices of one set of said guide elements in firm engagement with each other, thereby to hold the head firmly in position, said locking means including dogs provided with cam-heads one of said dogs being located on each side of said axis, a saw-mounting member carried by said head, and horizontally and vertically slidable thereon, means for effecting said movements of the head, independently of each other.

The further details of construction and operation of my device are hereinafter described with reference to illustrations in the accompanying drawings, in which.

Figures 1, 2:
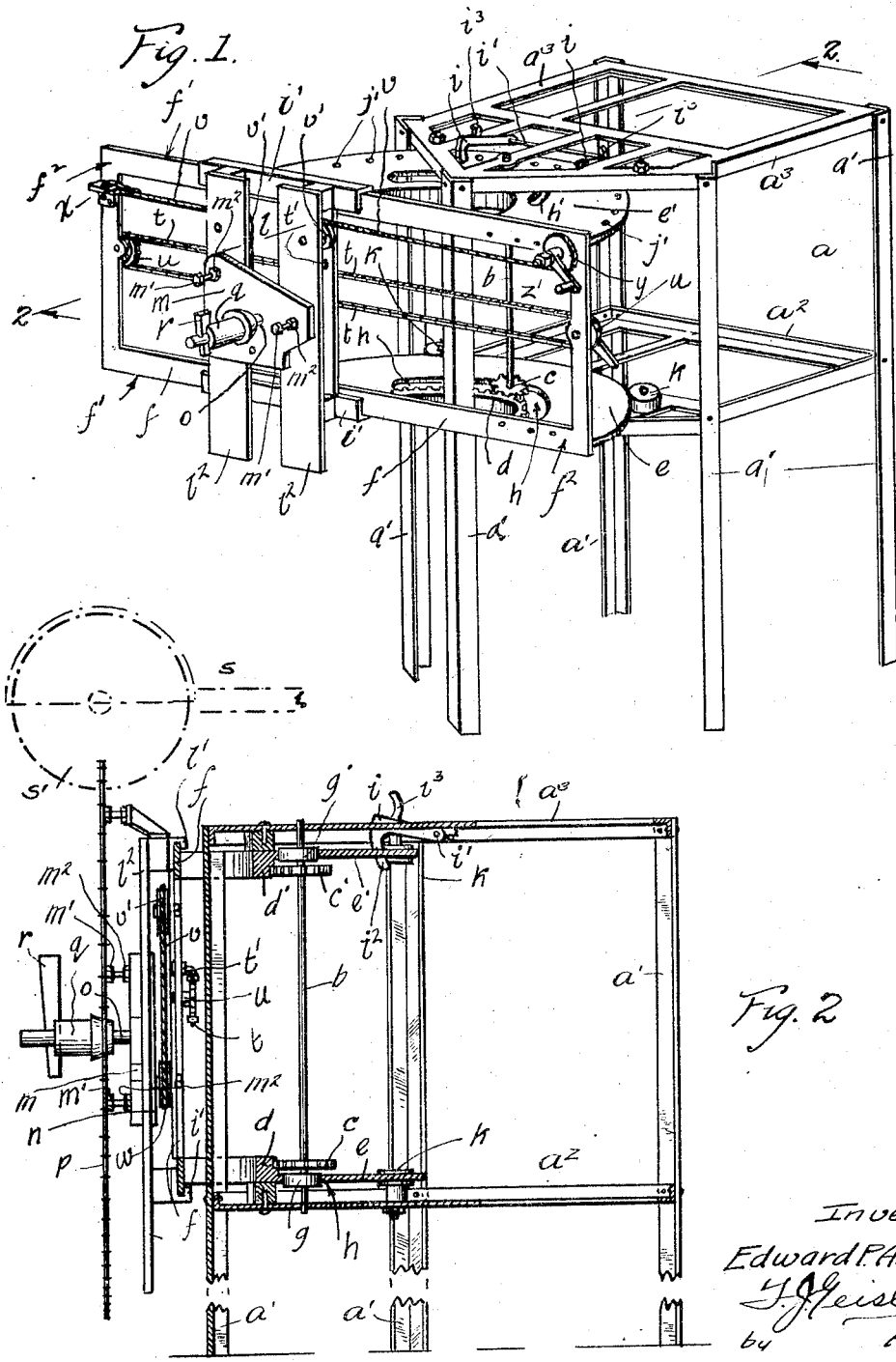
Fig. 1 is a perspective view of the frame and the adjustable head carried thereby, these portions being shown independently of the remaining portions of the saw sharpening machine because they are the specific parts which embody my invention.
Fig. 2 is a sectional elevation taken on the line 2—2 of Fig. 1, the rotatable grinder head being shown in dotted lines.
Figure 3:
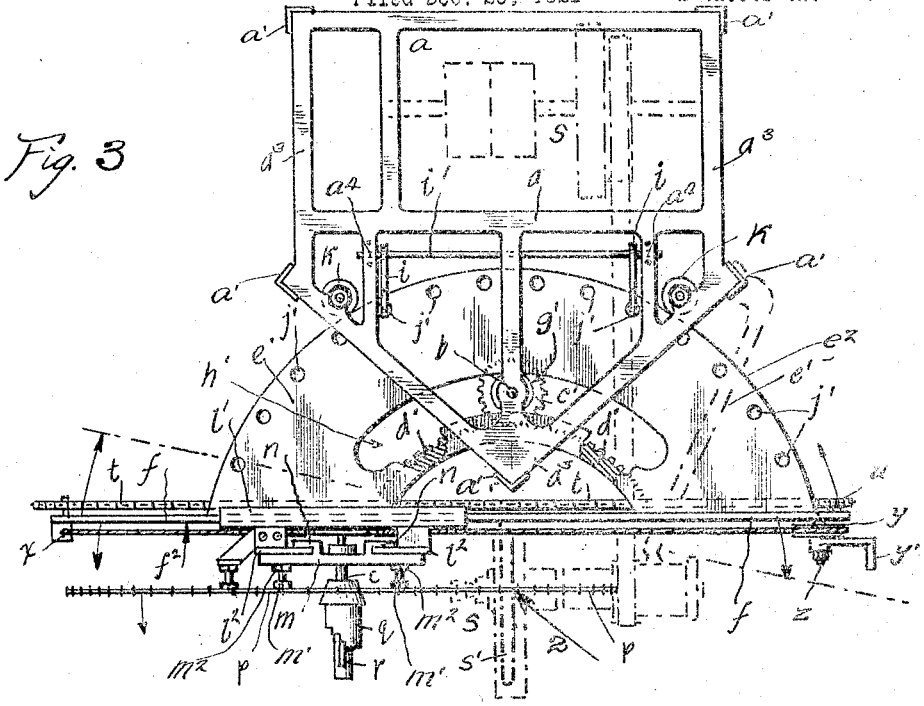
Fig. 3 is a plan view of the mechanism shown in Fig. 1 except that the approximate position of the grinding mechanism is shown in dotted lines.

My improved sharpening and gumming machine is supported by a frame $a$ which is preferably skeletonized for lightness and is made up with angular legs $a'$ so as to eliminate weight. This frame $a$ is made up with two spaced horizontal portions $a^2$ and $a^3$ which are spaced a substantial distance apart and are held in this spaced relationship by these legs $a'$. I journal the shaft $b$ vertically between these two horizontal portions $a^2$ and $a^3$ and at each end of the shaft I fix two pinions $c$ and $c'$. These two pinions mesh with the circular racks $d$ and $d'$ which form a part of the arcuate segments $e$ and $e'$. These arcuate segments are held in spaced relationship by the hollow frame $f$ and the spacing of the arcuate segments correspond with the spacing of the horizontal portions $a^2$ and $a^3$. These two pinions $c$ and $c'$, connected by the common shaft $b$, form an interlocking element between the segments $e$ and $e'$. Thus, if these segments tend to move relatively with each other this tendency is checked and the segments are kept in alinement by this rack and pinion element. These arcuate segments $e$ and $e'$ form with the hollow frame the adjustable saw holding head. I mount guiding wheels $g$ and $g'$ and each end of the vertical shaft $b$ which fit respectively in the arcuate guide slots $h$ and $h'$ in the arcuate segments $e$ and $e'$. These guide slots are concentric with the axis of rotation of the arcuate segments $e$ and $e'$ and the points from which all of said points are described is the point indicated by the arrow 2 in Fig. 3. As shown in this figure the saw holding head is supported by the frame $a$ but is permitted relative rotation therewith. The head may be locked in set position by the dogs $i$ which are connected by a shaft $i'$, the ends of which are journaled in the frame $a$, as at $a^4$, one at each side of the axis of rotation. The arcuate segment $e'$ is provided with a number of holes $j$ which are spaced concentrically about the arcuate outer surface $e^2$, of the member $e'$. These holes $j$ are sufficiently numerous so that the dogs $i$ will fit therein when the head is adjusted to the desired position, and the bearing faces of these dogs are tapered slightly or are arranged eccentrically with their pivot about the shaft $i'$ so as to provide a cam face and thus when the dogs are driven into the holes $j$, they will tend to force the arcuate segments against the guide roll $g$, and thus form therewith three points of support. When the dogs are thus driven into the holes $j$, the ends tend to push the segments tightly against the roll $g'$ so that the saw-holding head is firmly held in set poition and at the same time is accurately trued up to horizontal alinement with the frame $a$. The guide rolls $k$ are arranged on the opposed faces of the horizontal portions $a^2$ and $a^3$ so that their bearing faces lie along a circle the radius of which is identical with the radius of the arcuate segment $e$ and $e'$.

I provide a saw holding mechanism in the front of the rotatable saw holding head which is permitted to have both vertical and horizontal adjustment so that the saw supported thereby can be adjusted to the correct position with the grinder wheel, and also so that the machine can be used to sharpen different diameter saws. I will next describe this mechanism.

The longitudinal edges of the frame $f$ and also its longitudinal faces $f^2$ are planed smoothly so as to provide guide faces for the slidable member $l$ which extends transversely across the frame $f$. This slidable member is provided with overhanging lips $l'$ which extend over this frame work so as to prevent this slidable member $l$ from being removed from the hollow frame $f$. This slidable member is made up of two parallel pieces $l^2$ which are connected in spaced relationship at each end of the overhanging lips $l'$.

Figure 4:
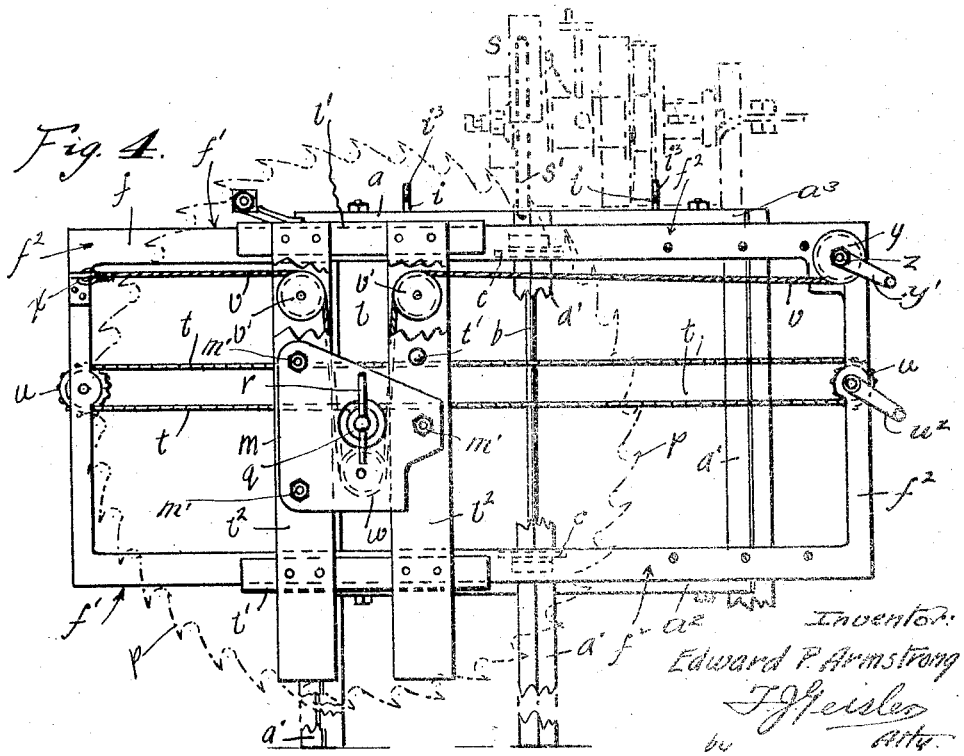
Fig. 4 is a front elevation of the mechanism, the circular saw and the grinding mechanism being shown in dotted lines and the adjustable head and its supporting frame being shown in full lines.

I arrange a slidable member $m$ so that it will slide upon this slidable member $l$ in a plane normally thereto. Thus, as shown in Fig. 4, the member $l$ is adjustable horizontally on the frame $f$, and the member $m$ is adjustable vertically on the member $l$, between the members $l^2$. The member $m$ also is provided with overhanging lips $n$ which grip the members $l^2$ so that the member $m$ cannot be disengaged from the member $l$.

I mount a mandrel $o$ so that it extends outwardly from the member $m$ and on this mandrel $o$ I place the circular saw $p$ which is to be sharpened or gummed. I hold the saw in place on the mandrel by a nut $q$ which in turn is held by a tapered key $r$, and the saw is held in parallelism by the heads of a number of screws $m'$ threaded into the slidable member $m$ which are held in adjusted position by the lock nuts $m^2$. The grinding mechanism is mounted upon the frame $a$ and extends outwardly therefrom so as to be directly over the saw $p$ which also extends outwardly from the saw holding head. This grinding mechanism supports a rotatable grinder wheel $s'$ and is fixed relatively to the frame $a$, as before mentioned, and the saw is adjustable thereto.

The horizontal adjustable member $l$ is moved on the frame $f$ by a chain $t$ which is attached to the frame $l$ at $t'$. This chain $t$ is mounted over sprockets $u$ and $u'$ which are mounted at each end of the frame $f$ and the member $u$ is rotated by a handle $u^2$. The vertical adjustable member $m$ is moved by a cable $v$ which is mounted over two pulleys $v'$ which are journaled on the members $l^2$ and the cable $v$ passes under a pulley $w$ which is journaled on the member $m$. One end of the cable is fastened as at $x$ and the other end passes around a pulley $y$ which is rotated by a handle $y'$, which is held in adjusted position by a nut $z$. It can thus be seen that the saw can be adjusted horizontally without disturbing the vertical adjustment, because the loop of cable around the pulley $w$ will remain the same length but will move relatively along the cable.

The operation of my device is as follows: When a saw is to be sharpened or gummed, it is placed on the mandrel $o$ and fastened tightly in place by the nut $q$ which is in turn fastened in place by driving home the tapered key $r$. The angle at which the saw is to be sharpened is then determined and the saw holding head is then adjusted to its proper angular position and the dogs $i$ are then forced home in their proper holes $j$ in the arcuate segments $e'$. The dogs being tapered or cam faced, as previously described, cause the head to be pushed into its proper position against the guide roll $g'$ and thus true relatively to the frame $a$. The saw $p$ is then adjusted vertically and horizontally so that it will be in position for the rotatable grinding element to operate upon it. Rotation of the handle $y$ in a counter clock wise direction as viewed in Fig. 4 moves the saw upwardly and the rotation of the handle $u^2$ pulls the saw towards the right and the opposite rotation of either handle will move the saw in the opposite direction.

I claim:

1. In a saw sharpening machine comprising a frame, saw-sharpening devices including a grinder-wheel carried by the frame, and a saw-holding head rotatable in a horizontal plane for adjustment relatively to said grinder-wheel, guide elements for said head provided on said frame and said head respectively, comprising two horizontal arcuate guide portions concentric with the axis of rotation of said head and vertically spaced apart, guide rollers co-operating with each of said guide portions, said guide rollers being located relatively to said axis and so as to provide a three-point support for each horizontal guide portion of said head at all times.

2. In a saw sharpening machine comprising a frame, saw-sharpening devices including a grinder-wheel carried by the frame, and a saw-holding head rotatable in a horizontal plane for adjustment relatively to said grinder-wheel, guide elements for said head provided on said frame and said head respectively, comprising two horizontal guide portions concentric with the axis of rotation of said head and vertically spaced apart, such guide portions provided with arcuate guide slots, guide rollers co-operating with said guide slots and the edge portions of said portions, said guide rollers being located relatively to said axis and so as to provide a three-point support for each horizontal guide portion of said head at all times.

3. In a saw sharpening machine comprising a frame, saw-sharpening devices including a grinder-wheel carried by the frame, and a saw-holding head rotatable in a horizontal plane for adjustment relatively to said grinder-wheel, guide elements for said head provided on said frame and said head respectively, comprising two horizontal arcuate guide portions concentric with the axis of rotation of said head and vertically spaced apart, guide rollers co-operating with said guide portions, means for locking the devices of one set of said guide elements in firm engagement with each other, thereby to hold the head firmly in position, said locking means also serving to aline the head relatively to the frame.

4. In a saw sharpening machine comprising a frame, saw-sharpening devices including a grinder-wheel carried by the frame, and a saw-holding head rotatable in a horizontal plane for adjustment relatively to said grinder-wheel, guide elements for said head provided on said frame and said head respectively, comprising two horizontal arcuate guide portions concentric with the axis of rotation of said head and vertically spaced apart, guide rollers co-operating with said guide portions, one set of said guide rollers being located centrally relatively to said axis means for locking the devices of one set of said guide elements in firm engagement with each other, thereby to hold the head firmly in position, said locking means being located on each side of said axis, and arranged to co-operate with said centrally located guide rollers to aline the head relatively to said frame.

5. In a saw sharpening machine comprising a frame, saw-sharpening devices including a grinder-wheel carried by the frame, and a saw-holding head rotatable in a horizontal plane for adjustment relatively to said grinder-wheel, guide elements for said head provided on said frame and said head respectively, comprising two horizontal arcuate guide portions concentric with the axis of rotation of said head and vertically spaced apart, guide rollers co-operating with said guide portions, said guide rollers being located relatively to said axis and so as to provide a three-point support for said head at all times, means for locking the devices of one set of said guide elements in firm engagement with each other, thereby to hold the head firmly in position, said locking means including dogs provided with cam-heads, one of said dogs being located on each side of said axis.

6. In a saw sharpening machine comprising a frame, saw-sharpening devices including a grinder-wheel carried by the frame, and a saw-holding head rotatable in a horizontal plane for adjustment relatively to said grinder-wheel, guiding means provided on said frame and head respectively, and means independent thereof for holding the head in horizontal alinement.

7. In a saw sharpening machine comprising a frame, saw-sharpening devices including a grinder-wheel carried by the frame, and a saw-holding head rotatable in a horizontal plane for adjustment relatively to said grinder-wheel, means provided on said frame and head respectively for holding the latter in horizontal alinement, such means comprising horizontal arcuate racks concentric with said axis and vertically spaced apart, and pinions rigid on a common shaft meshing with said racks.

8. In a saw sharpening machine comprising a frame, saw-sharpening devices including a grinder-wheel carried by the frame, and a saw-holding head rotatable in a horizontal plane for adjustment relatively to said grinder-wheel, guide elements for said head provided on said frame and said head respectively, comprising two horizontal arcuate guide portions concentric with the axis of rotation of said head and vertically spaced apart, guide rollers co-operating with said guide portions, said guide rollers being located relatively to said axis and so as to provide a three-point support for said head at all times, means independent of said guide means provided on said frame and head respectively for holding the latter in horizontal alinement.

9. In a saw sharpening machine comprising a frame, saw-sharpening devices including a grinder-wheel carried by the frame, and a saw-holding head rotatable in a horizontal plane for adjustment relatively to said grinder-wheel, guide elements for said head, provided on said frame and said head respectively, comprising two horizontal arcuate guide portions concentric with the axis of rotation of said head and vertically spaced apart, guide rollers co-operating with said guide portions, said guide rollers being located relatively to said axis and so as to provide a three-point support for said head at all times, means provided on said frame and head respectively for holding the latter in horizontal alinement, such means comprising horizontal arcuate racks concentric with said axis and vertically spaced apart, and pinions rigid on a common shaft meshing with said racks.

10. In a saw sharpening machine comprising a frame, saw-sharpening devices including a grinder-wheel carried by the frame, and a saw-holding head rotatable in a horizontal plane for adjustment relatively to said grinder-wheel, guide elements for said head provided on said frame and said head respectively, comprising two horizontal arcuate guide portions concentric with the axis of rotation of said head and vertically spaced apart, guide rollers co-operating with said guide portions, said guide rollers being located relatively to said axis and so as to provide a three-point support for said head at all times, means independent of said guide means provided on said frame and head respectively for holding the latter in horizontal alinement, means for locking the devices of one set of said guide elements in firm engagement with each other, thereby to hold the head firmly in position.

11. In a saw sharpening machine comprising a frame, saw-sharpening devices including a grinder-wheel carried by the frame, and a saw-holding head rotatable in a horizontal plane for adjustment relatively to said grinder-wheel, guide elements for said head, provided on said frame and said head respectively, comprising two horizontal arcuate guide portions concentric with the axis of rotation of said head and vertically spaced apart, guide rollers co-operating with said guide portions, said guide rollers being located relatively to said axis and so as to provide a three-point support for said head at all times, means provided on said frame and head respectively for holding the latter in horizontal alinement, such means comprising horizontal arcuate racks concentric with said axis and vertically spaced apart, and pinions rigid on a common shaft meshing with said racks, means for locking the devices of one set of said guide elements in firm engagement with each other, thereby to hold the head firmly in position.

12. In a saw sharpening machine comprising a frame, saw-sharpening devices including a grinder-wheel carried by the frame, and a saw holding head rotatable in horizontal plane for adjustment relatively to said grinder wheel, a saw-mounting member carried by said head and horizontally and vertically slidable thereon, and means for effecting said movements of the head independently of each other, and of the saw mounting member.

13. In a saw sharpening machine comprising a frame, saw sharpening devices including a grinder wheel carried by the frame, and a saw holding head rotatable in a horizontal plane for adjustment relatively to said grinder wheel, guide elements for said head provided on said frame and said head respectively comprising two horizontal arcuate guide portions concentric with the axis of rotation of said head and vertically spaced apart, such guide portions provided with arcuate guide slots, a vertical rod passing through said guide slots and being fastened at each end to said frame, and guide rollers on said rod co-operating with said guide slots.

14. In a saw sharpening machine comprising a frame, saw sharpening devices including a grinder wheel carried by the frame, and a saw holding head rotatable in a horizontal plane for adjustment relatively to said grinder wheel, guide elements for said head provided on said frame and said head respectively comprising two horizontal arcuate guide portions concentric with the axis of rotation of said head and vertically spaced apart, such guide portions provided with arcuate guide slots, a vertical rod passing through said guide slots and being fastened at each end to said frame, and guide rollers on said rod co-operating with said guide slots, said guide rollers being located centrally relatively to said axis.

15. In a saw sharpening machine comprising a frame, saw sharpening devices including a grinder wheel carried by the frame, and a saw holding head rotatable in a horizontal plane for adjustment relatively to said grinder wheel, guide elements for said head provided on said frame and said head respectively comprising two horizontal arcuate guide portions concentric with the axis of rotation of said head and vertically spaced apart, such guide portions provided with arcuate guide slots, a vertical rod passing through said guide slots and being fastened at each end to said frame, guide rollers on said rod co-operating with said guide slots, said guide rollers being located centrally relatively to said axis, and guide rollers co-operating with the arcuate periphery of said portions, said peripheral rollers forming with said first-mentioned rollers a three-point support for each of said guide portions.

16. In a saw sharpening machine comprising a frame, saw sharpening devices including a grinder wheel carried by the frame, and a saw holding head rotatable in a horizontal plane for adjustment relatively to said grinder wheel, guide elements for said head provided on said frame and said head respectively comprising two horizontal arcuate guide portions concentric with the axis of rotation of said head and vertically spaced apart, such guide portions provided with arcuate guide slots, a vertical rod passing through said guide slots and being fastened at each end to said frame, and horizontal arcuate racks provided on said head on each of said guide portions, said racks being concentric with said axis, and pinions fixed to said vertical rod and meshing with said racks, said racks and pinions functioning to hold the head in horizontal alinement with said frame.

17. In a saw sharpening machine comprising a frame, saw sharpening devices including a grinder wheel carried by the frame, and a saw holding head rotatable in a horizontal plane for adjustment relatively to said grinder wheel, guide elements for said head provided on said frame and said head respectively comprising two horizontal arcuate guide portions concentric with the axis of rotation of said head and vertically spaced apart, such guide portions provided with arcuate guide slots, and connected locking devices at each side of said axis adapted to hold said head relatively to said frame.

18. In a saw sharpening machine comprising a frame, saw sharpening devices including a grinder wheel carried by the frame, and a saw holding head rotatable in a horizontal plane for adjustment relatively to said grinder wheel, guide elements for said head provided on said frame and said head respectively comprising two horizontal arcuate guide portions concentric with the axis of rotation of said head and vertically spaced apart, such guide portions provided with arcuate guide slots, and locking devices at each side of said axis adapted to hold said head relatively to said frame, said locking means arranged to hold said head in vertical alinement with said frame.

19. In a saw sharpening machine comprising a frame, saw sharpening devices including a grinder wheel carried by the frame, and a saw holding head rotatable in a horizontal plane for adjustment relatively to said grinder wheel, guide elements for said head provided on said frame and said head respectively comprising two horizontal arcuate guide portions concentric with the axis of rotation of said head and vertically spaced apart, such guide portions provided with arcuate guide slots, and locking devices at each side of said axis adapted to hold said head relatively to said frame, said locking means being tapered and thus arranged to hold said head in vertical alinement with said frame.

20. In a saw sharpening machine comprising a frame, saw sharpening devices including a grinder wheel carried by the frame, and a saw holding head rotatable in a horizontal plane for adjustment relatively to said grinder wheel, guide elements for said head provided on said frame and said head respectively comprising two horizontal arcuate guide portions concentric with the axis of rotation of said head and vertically spaced apart, such guide portions provided with arcuate guide slots, a saw mounting member carried by said head and horizontally and vertically slidable thereon, and mechanism at one side of said head for effecting said vertical and horizontal movements of said head independently of each other.

21. In a saw sharpening machine comprising a frame, saw sharpening devices including a grinder wheel carried by the frame, and a saw holding head rotatable in a horizontal plane for adjustment relatively to said grinder wheel, guide elements for said head provided on said frame and said head respectively comprising two horizontal arcuate guide portions concentric with the axis of rotation of said head and vertically spaced apart, such guide portions provided with arcuate guide slots, a saw mounting member carried by said head and horizontally and vertically slidable thereon, and adjustable means on said head adapted to aline the saw carried thereby relatively to said mounting member.

EDWARD P. ARMSTRONG.